Patented Dec. 29, 1931

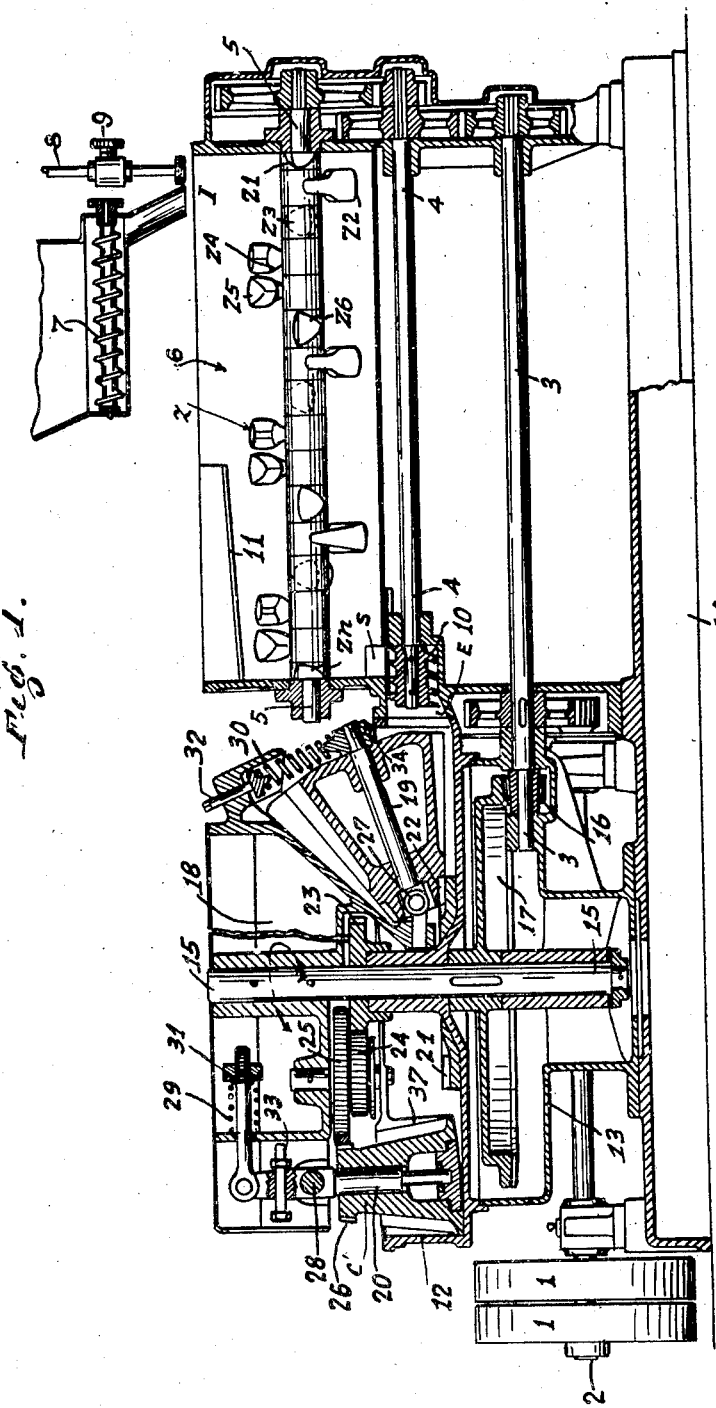

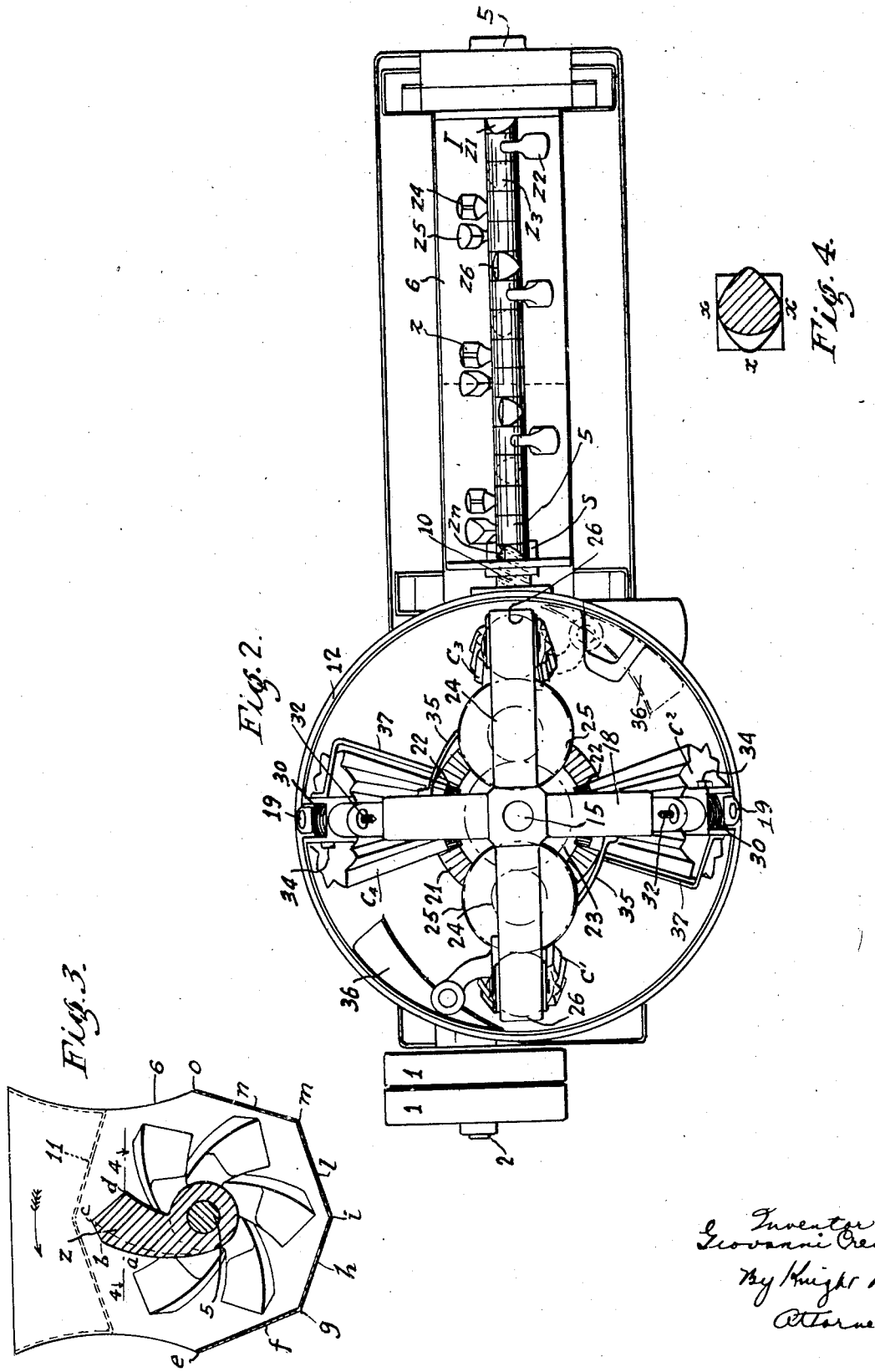

1,838,533

UNITED STATES PATENT OFFICE

GIOVANNI CRESPI, OF MILAN, ITALY

DOUGH KNEADING MACHINE

Application filed January 3, 1930, Serial No. 418,391, and in Italy January 12, 1929.

The present invention relates to a process and a machine for mixing, kneading, and crushing flour meal and water in the alimentary industries (alimentary pastes, biscuits, bread etc.). The object of the invention is to produce certain constructive devices and special arrangements which permit the obtaining, as will be set out below, of a continuous and automatic production of the desired product with great practicability and with a considerable saving in labour as compared with the systems heretofore in use.

In the accompanying drawings,

Fig. 1 represents the machine in question in sectional elevation with one of the rollers turned 90° from its position as shown in Fig. 2, Fig. 2 is the corresponding plan view of the machine, Fig. 3 is a cross section on a larger scale of the trough and a blade of the mixing machine, Fig. 4 is a cross section through the wider portion of the said blade of the mixing machine along line 4—4 of Fig. 3.

A shaft 2—2 is driven through fixed and loose pulleys 1—1 and actuates a shaft 3—3 which in its turn actuates, at suitable speeds, the shafts 4—4 and 5—5, these two shafts being suitably connected to one another and to the common baseplate 14.

The shaft 5 carries a plurality of blades ($Z_1$, $Z_2$ $Z_n$) revolving in a stationary trough 6 and distributed in one or more helical lines round about the shaft periphery.

The hand and pitch of such helical line or lines is so designed as to bring about a slow travelling motion of the trough contents from the blade $Z_1$ to the blade $Z_n$ within the time required to attain the desired degree of mixing and kneading.

To secure an efficient mixing, the blades design shows a suitable leading surface $a$—$x$—$x$ (Fig. 4) and a certain curvature $a$—$b$—$c$ along said surface (Fig. 3) as well as a suitable inclination relatively to the radial direction.

The walls of the trough 6, instead of being circular, are built up of a suitable number of faces $e$—$f$—$g$—$h$—$i$—$l$—$m$—$n$—$o$. The blade curvature and inclination, the approaching of the ridge $c$ to the points $f$—$h$—$l$—$n$ of the side faces and the receding of said point $c$ from the points $e$—$g$—$i$—$m$—$o$ cause the trough contents to be crushed and to slide in succession. The said construction also brings about the required upturning of the dough. This is intensified by the provision of the ridge $c$ provided on the blades and the adjacent receding surface $c$—$d$.

In this manner a certain degree of cohesion and kneading of the mixture is obtained in the mixing trough itself, the successive working of the dough being thus facilitated and accelerated.

Finally, the shape of the blades Z must be so designed that the dough is prevented from sticking thereto and from finding dead zones in which it might accumulate and revolve along with the blades. To this effect the cross section of the blades must exhibit at all its points a streamline and receding shape such, for instance, as shown in Fig. 4.

The trough 6 may be lined, over a portion of its length, with a polygonal plate 11 so as to better enclose the mixture and to improve the working of it at the faces formed by the said plates. The worm 10, provided beneath the outlet S of the trough 6, discharges the mixed and kneaded product into a circular trough or pan 12, E being the inlet of the latter. The pan 12 is permanently connected, through the intermediary of a pedestal 13, to the baseplate 14 of the whole machine, and its bottom is traversed at the center by a vertical spindle 15 rotated by the shaft 3 through pinion 16 and gear wheel 17.

To the top of the spindle 15 a crossbar 18 is secured, which carries a set of fluted rollers $C_1$—$C_2$—$C_3$—$C_4$. These rollers may run loose or be positively rotated about their axes 19—20 at a suitable speed by toothed wheels, for instance, by means of a bevel wheel 21 and pinion 22 for the horizontal conical rollers and by means of spur gears 23—24—25—26 for the vertical conical rollers. The said gears should be suitably designed to allow of a certain amount of swinging of the roller axis about the pivots 27 respectively 28.

The roller set shown comprises two horizontal rollers C2—C4 working in a direction perpendicular to the horizontal plane of the pan, and two vertical rollers C1—C3 working in a direction perpendicular to the vertical peripheral wall of the pan.

The rollers are pressed against the dough firstly by their own weight and by the weight of the crossbar 18 as far as the horizontal rollers are concerned, and then by springs 29—30 fitted with pressure adjusting devices 31—32. Stops 33—34 are provided, by means of which the minimum distance between the rollers and the pan surfaces can be adjusted.

Dough-guiding plates 35 and dough-turning plates 36 are also provided in order to push the dough towards the periphery of the pan and to cause the dough sheet to fall and to be turned over when it adheres to the vertical peripheral wall of the pan due to the action of the rollers C1—C3. Also scrapers 37 may be provided in order to detach any portion of the dough tending to stick to the rollers and to revolve along with them.

The described set of rollers, their rotation about their axis at a suitable speed as well as their shape have the object of malaxating the dough without dragging it forward, and to avoid any pulling and slipping of the dough which would impair the quality of the product. The horizontal rollers, under the action of the bevel gears 21—22 roll over the dough and crush it; the vertical rollers work the dough from its side edge while the dough sheet is lying flat on the pan bottom, which is the easiest and most natural manner. The form of the latter rollers as shown on the drawing viz. with inclined fluting and with a solid (non-fluted) ring at the base has for its object to press the dough into a vertical sheet having a minimum thickness at the bottom where it rests on the pan bottom and a greater thickness (and therefore a greater weight) at the top. In this manner the vertical sheet is obliged to fall, whereby it is turned and presents its other face to the next horizontal roller.

The provision of the springs 29—30 and of the stops for adjustment of the minimum distance between the rollers and the pan sides has for its object to maintain a determined thickness and to secure a constant or nearly constant degree of malaxation and hourly output, since the said springs automatically increase the pressure if the dough sheet tends to increase in thickness over normal, while they lessen the pressure if the thickness of the dough sheet tends to diminish.

As the crossbar 18 revolves in the direction indicated by the arrows in Figs. 1 and 2, the mixture conveyed into the pan by the worm 10 across the pan inlet E arranges itself along the periphery of the pan and moves slowly forward in the direction of the arrow at a speed that can be calculated from the revolving speed of the crossbar and from the relative speed of the rollers revolving about their axis. After performing an approximately complete peripheral revolution in the pan, the dough reaches the pan outlet U and during this revolution it will have been subjected to several crushing and overturning operations the number of which can be determined in advance with a fair approximation.

I further wish to mention that the sole object of the provision of the worm 10 is to adjust and to effect the discharge of the mixture from the trough 6 into the pan 12; this worm however does not fulfil any function in the mixing and working, proper care being taken on the contrary to avoid any pulling action on the dough as harmful.

By providing a continuous supply of flour and water by means of the measuring worm conveyor 7 and measuring pipe 9, a mixing and kneading can be obtained first in the trough 6 through the blades Z1—Z2, and then a malaxating action in the pan 12 through the rollers C1—C2—C3—C4, the working being continuous and automatic and the duration of the various operations as well as the degree of working being established in advance. These are established by suitably fixing the speeds, and the dimensions and the shape of the blades Z, the shape of the walls of the trough 6 as well as the dimensions and shape of the rollers C1—C2—C3—C4, the pressure exerted by the springs 29—30 and the position of the respective setting and adjusting devices.

The hourly output of the machine can be determined in advance by suitably determining the amount of flour and water supplied by measuring worm conveyor and water measuring pipe, and by suitably adjusting the speed of the discharge worm 10, the thickness of the dough sheet as well as its velocity, which latter regulation is effected by suitably proportioning the distance of the rollers from the pan sides, the pressure exerted by the springs, and the relative speed of the rollers about their axis.

The object of the automatic and continuous working of the machine is to secure a constant feed for the continuously working, rolling, cutting, stamping, or press machines and thus to secure continuity throughout the whole of the alimentary paste manufacturing process.

Having described my invention, I claim:

1. A process for mixing and malaxating alimentary pastes which consists in mixing flour and water by crushing and upturning the same, then rolling said mixture into a flat sheet, and then exerting a rolling pressure on said sheet from the sides thereof in a direction substantially transverse to the thickness of said sheet whereby said mixture is again rolled into a flat sheet.

2. A kneading machine including a trough, a set of rollers within said trough, each roller being pivotally mounted at one end thereof with each alternative roller rotating about an axis substantially at right angles to its adjacent roller, means for bodily rotating said set of rollers, means for causing each of said rollers to rotate about its axis, alternate ones of said rollers extending close to the bottom and sides of said trough in substantially horizontal and vertical directions respectively, and means for resiliently urging the ends of the horizontally and vertically rotatable rollers opposite the pivoted ends towards the bottom and sides of said trough respectively.

3. A kneading machine including a trough, a set of rollers within said trough, each alternative roller rotating about an axis substantially at right angles to its adjacent roller, means for bodily rotating said set of rollers, means for causing each of said rollers to rotate about its axis, alternate ones of said rollers extending close to the bottom and sides of said trough in substantially horizontal and vertical directions respectively, and means for guiding the dough towards the periphery of the trough in front of each of said vertically rotatable rollers.

4. A kneading machine including a trough, a set of rollers within said trough, each alternative roller rotating about an axis substantially at right angles to its adjacent roller, means for bodily rotating said set of rollers, means for causing each of said rollers to rotate about its axis, alternate ones of said rollers extending close to the bottom and sides of said trough in substantially horizontal and vertical directions respectively, said vertically rotatable rollers being of frustro-conical shape decreasing in diameter toward the top.

Signed at Milan, Italy, this 16th day of December, 1929.

GIOVANNI CRESPI.